(12) United States Patent
Boodannavar et al.

(10) Patent No.: US 10,986,563 B2
(45) Date of Patent: Apr. 20, 2021

(54) ADAPTIVE WIFI ROAMING

(71) Applicant: Apple Inc., Cupertino, CA (US)

(72) Inventors: Veerendra Boodannavar, Cupertino, CA (US); Kapil Chhabra, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 15/618,276

(22) Filed: Jun. 9, 2017

(65) Prior Publication Data

US 2017/0359773 A1    Dec. 14, 2017

Related U.S. Application Data

(60) Provisional application No. 62/348,582, filed on Jun. 10, 2016.

(51) Int. Cl.
| | |
|---|---|
| *H04W 48/16* | (2009.01) |
| *H04W 48/20* | (2009.01) |
| *H04W 48/12* | (2009.01) |
| *H04W 8/02* | (2009.01) |
| *H04W 12/06* | (2021.01) |
| *H04W 84/12* | (2009.01) |

(52) U.S. Cl.
CPC .......... *H04W 48/12* (2013.01); *H04W 8/02* (2013.01); *H04W 12/0602* (2019.01); *H04W 48/16* (2013.01); *H04W 48/20* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,251,685 B1* | 7/2007 | Yildiz | ..................... | H04L 43/18 709/221 |
| 2004/0240412 A1* | 12/2004 | Winget | ............. | H04W 12/0602 370/331 |
| 2008/0072047 A1* | 3/2008 | Sarikaya | ............. | H04L 63/0869 713/171 |
| 2009/0185536 A1* | 7/2009 | Sood | ................... | H04L 61/2015 370/331 |
| 2014/0050320 A1* | 2/2014 | Choyi | ..................... | H04L 63/08 380/270 |
| 2014/0098952 A1* | 4/2014 | Ikeda | ................ | H04W 12/0013 380/31 |

(Continued)

*Primary Examiner* — Ruihua Zhang
(74) *Attorney, Agent, or Firm* — Sterne, Kessler, Goldstein & Fox P.L.L.C.

(57) ABSTRACT

The present disclosure describes a method for adaptive WiFi roaming, where an electronic device and an access point advertise their networking capability. The networking capability may be, for example, the capability to support at least one enterprise feature. Based on the advertisements transmitted by the electronic device, the access point can determine that the electronic device can support the at least one enterprise feature and may selectively enable the at least one enterprise feature. Additionally, based on advertisements transmitted by the access point, the electronic device can determine that the access point can support the at least one enterprise feature. Based on this mutual determination, the access point and electronic device may continue an association process based on the at least one enterprise feature.

20 Claims, 7 Drawing Sheets

(56) References Cited

U.S. PATENT DOCUMENTS

| | | | | |
|---|---|---|---|---|
| 2015/0117436 A1* | 4/2015 | Jafarian | ............... | H04W 76/10 |
| | | | | 370/347 |
| 2015/0156710 A1* | 6/2015 | Montemurro | ......... | H04W 48/18 |
| | | | | 370/329 |
| 2016/0135053 A1* | 5/2016 | Lee | ................. | H04L 63/0407 |
| | | | | 726/7 |
| 2016/0135199 A1* | 5/2016 | Wang | ............... | H04W 74/0816 |
| | | | | 455/450 |
| 2016/0212693 A1* | 7/2016 | Lee | ..................... | H04W 48/14 |
| 2017/0171833 A1* | 6/2017 | Vamaraju | .............. | H04W 60/04 |
| 2018/0255602 A1* | 9/2018 | Ponnuswamy | ....... | H04W 76/18 |
| 2019/0075469 A1* | 3/2019 | Mahoney | ............. | H04W 16/12 |
| 2019/0289539 A1* | 9/2019 | Lee | ................... | H04W 40/246 |

* cited by examiner

ADAPTIVE WIFI ROAMING

CROSS-REFERENCE TO RELATED APPLICATION

This application claims the benefit of U.S. Provisional Application No. 62/348,582, titled "Adaptive Wifi Roaming," filed on Jun. 10, 2016, which is incorporated by reference in its entirety.

BACKGROUND

Technical Field

The described embodiments relate to techniques for improve WiFi roaming through, for example, an out-of-band enterprise-feature advertising protocol.

Background

WiFi roaming can involve a two-step process by which electronic devices first scan hardware-supported channels to find potential access points and then select an appropriate access point to establish a WiFi connection. Various enterprise features (e.g., IEEE 802.11k and IEEE 802.11r) have been developed for electronic devices to enhance roaming between access points, particularly in enterprise networks. These enterprise features enhance roaming in a number of ways by, for example, increasing the speed and efficiency by which enterprise-capable electronic devices can select and associate with enterprise-capable access points. Accordingly, electronic devices that support enterprise features can roam between access points more efficiently than legacy electronic devices.

SUMMARY

Adoption of enterprise features in access points is low because of interoperability issues between legacy electronic devices (e.g., electronic devices that are not capable of utilizing the enterprise features) and access points that employ such features. Enterprise features thus are underutilized by enterprise-capable electronic devices. The present disclosure describes an out-of-band enterprise feature advertising protocol that enables enterprise-capable electronic devices to communicate based on one or more enterprise features. The advertising protocol allows an enterprise-capable electronic device to communicate with other enterprise-capable electronic devices as well as legacy electronic devices that do not support enterprise features. Accordingly, the advertising protocol enables a heterogeneous network that includes both legacy electronic devices and enterprise-capable electronic devices while taking advantage of the enterprise features of the enterprise-capable electronic devices.

Provided herein are methods and electronic devices implementing the out-of-band enterprise feature advertising protocol. Some embodiments relate to a method performed by an enterprise-capable electronic device that includes transmitting a first frame that includes a first information element to a wireless access point. The first information element may indicate that the enterprise-capable electronic device supports at least one enterprise feature. The method may further include receiving a second frame in response to transmitting the first frame, where the second frame includes connectivity information regarding the wireless access point. The second frame may be transmitted by the wireless access point in response to receiving the first frame. The method includes the enterprise-capable electronic device associating with the wireless access point based at least in part on the connectivity information and the at least one enterprise feature.

Some embodiments relate to another method performed by an enterprise-capable electronic device for the enterprise feature advertising protocol. The method may include transmitting a first frame that includes a first information element to a first wireless access point and a second frame that includes a second information element to a second wireless access point. The first information element and second information element may indicate that the enterprise-capable electronic device supports at least one enterprise feature. The method may include receiving a third frame from a first wireless access point and a fourth frame from a second wireless access point. The third frame may include first connectivity information regarding the first wireless access point and the fourth frame may include second connectivity information regarding the second wireless access point. The method may also include, after receiving the third frame and the fourth frame, determining a candidate wireless access point between the first wireless access point and the second wireless access point based at least in part on the first connectivity information and the second connectivity information and associating with the candidate wireless access point based at least in part on the at least one enterprise feature.

Some embodiments relate to an electronic device that includes a processor configured to receive at least one advertising message from at least one wireless access point and detect an enterprise information element in the at least one advertising message. The enterprise information element may be configured to indicate that the at least one wireless access point supports an enterprise feature. The processor may be further configured to select a candidate wireless access point from the at least one wireless access point based at least in part on the detecting the enterprise information. Based on this selection, the processor may be further configured to transmit an authentication request to the candidate wireless access point and receive an authentication response message from the candidate wireless access point. The processor may be further configured to transmit an association request to the wireless access point and receive an association response from the wireless access point. The association request and association response are configured to establish a session key between the candidate wireless access point and the electronic device.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
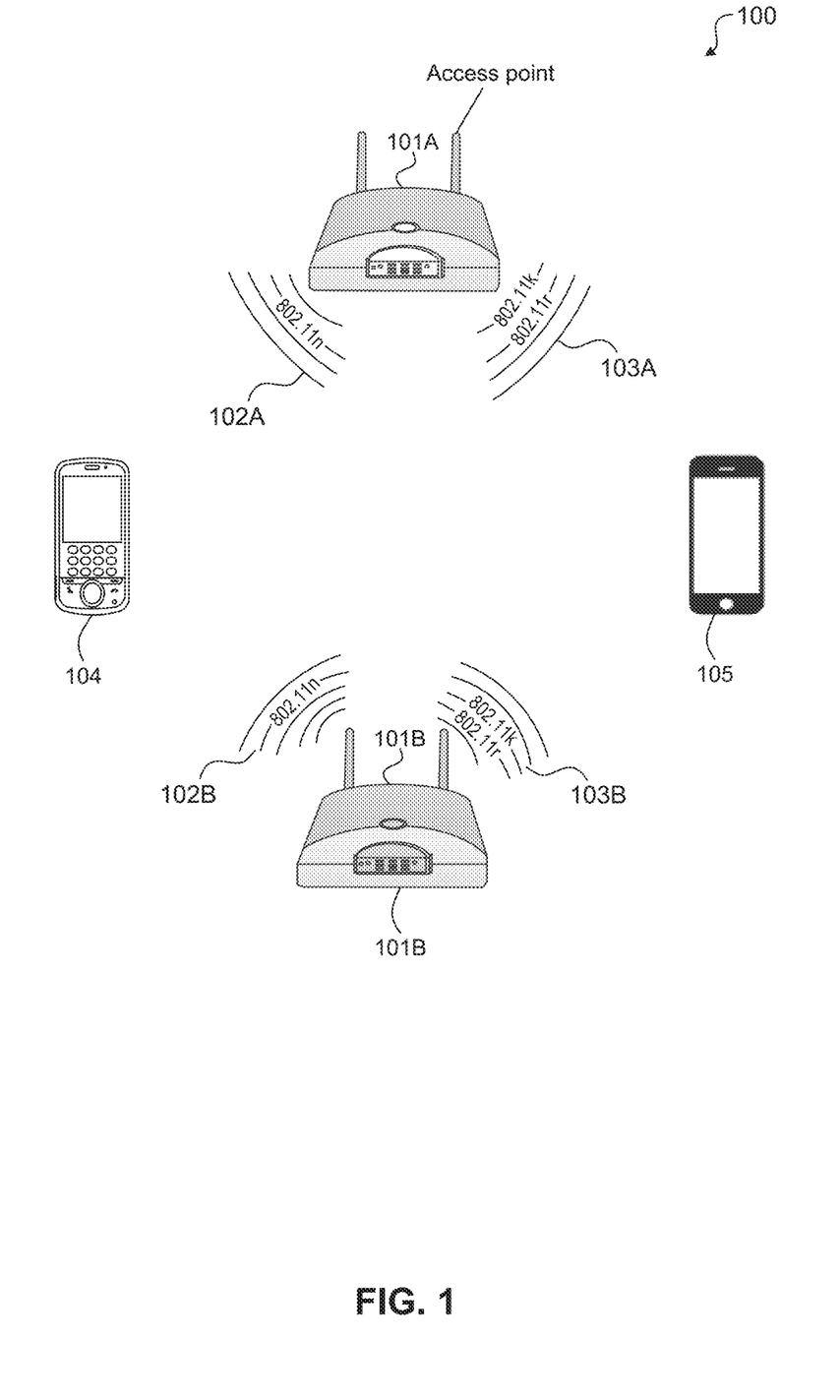
FIG. 1 is a block diagram of an exemplary system with adaptive Wi-Fi roaming capability, according to some embodiments.

FIG. 1 is a block diagram of an exemplary system with adaptive Wi-Fi roaming capability, according to some embodiments. System 100 includes an access point 101A, an access point 101B, a legacy electronic device 104, and an enterprise-capable electronic device 105. In some embodiments, legacy electronic device 104 and enterprise-capable electronic device 105 roam and each selects either access points 101A or 101B. In some embodiments, legacy electronic device 104 and enterprise-capable electronic device 105 are mobile devices which may include but are not limited to smartphones, laptops, and tablets. An enterprise-capable electronic device refers to a device, such as electronic device 105 that is capable of implementing enterprise features such as, for example, features in the IEEE 802.11k and IEEE 802.11r standards. Electronic devices that do not support enterprise features, such as electronic device 104 may be considered "legacy electronic devices." Similarly, non-enterprise features, such as features in the IEEE 802.11n standard, may be considered legacy features.

Enterprise features differ from legacy features by, for example, employing different roaming implementations. Enterprise-capable electronic devices that implement IEEE 802.11k can roam between access points by identify neighboring access points to which they may potentially connect during the roam process and limit their scan to those channels utilized by potential neighboring access points. IEEE 802.11k optimizes the number of search channels during the roaming process by reducing the number of scanned channels when communicating with a potential access point. IEEE 802.11r reduces the number of steps performed by the electronic device to establish a roaming connection with an access point. Enterprise-capable electronic devices that support IEEE 802.11r employ a reduced number of steps to establish a roaming connection with an access point by incorporating session-key steps into IEEE 802.11 association messages, thus eliminating the extra messages typically used during IEEE 802.1x extensible authentication protocol (EAP) authentication.

Legacy electronic device 104 may be implemented as, but is not limited to, legacy set-top boxes, legacy remote controls, legacy game controllers, legacy cellular phones, legacy smart phones, legacy wearable devices, legacy tablets, legacy personal digital assistants (PDAs), legacy laptops and/or legacy desktop computers. Enterprise-capable electronic device 105 may be implemented as, but is not limited to, any enterprise-capable electronic device that support IEEE 802.11k and IEEE 802.11r standards, such as set-top boxes, remote controls, game controllers, cellular phones, smart phones, wearable devices, tablets, personal digital assistants (PDAs), laptops and/or desktop computers. For example, in some embodiments, legacy electronic device 104 may be implemented as a cellular phone and enterprise-capable electronic device 105 may be implemented as a smart phone. Other configurations of system 100 that include differing numbers of access points and electronic devices are possible and within the scope of the disclosure.

In some embodiments, access points 101A and 101B support non-enterprise features such as IEEE 802.11n communications as well as enterprise features such as IEEE 802.11k and IEEE 802.11r communications. Access points 101A and 101B can communicate using non-enterprise features and enterprise features simultaneously through connections 102A-102B and 103A-103B. Connections 102A-102B enable access points 101A-101B, respectively, to communicate with legacy electronic devices, such as legacy electronic device 104. In some embodiments, connections 102A-102B enable IEEE 802.11n communications between access points 101A-101B and legacy electronic device 104. Connections 103A-103B enable access points 101A-101B, respectively, to communicate with enterprise-capable electronic devices such as enterprise-capable electronic device 105. In some embodiments, connections 103A-103B enable IEEE 802.11k and IEEE 802.11n communications between access points 101A-101B and enterprise-capable electronic device 105.

The discussion of IEEE 802.11n as a legacy communication standard is merely exemplary. According to some embodiments, connections 102A-102B may employ different communication standards that are legacy features. Similarly, the discussion of IEEE 802.11k and IEEE 802.11r an enterprise standards are merely exemplary. Connections 103A-103B may employ different communication standards that have the same roaming capability features as described above with respect to the IEEE 802.11k and IEEE 802.11r standards.

Figure 2:
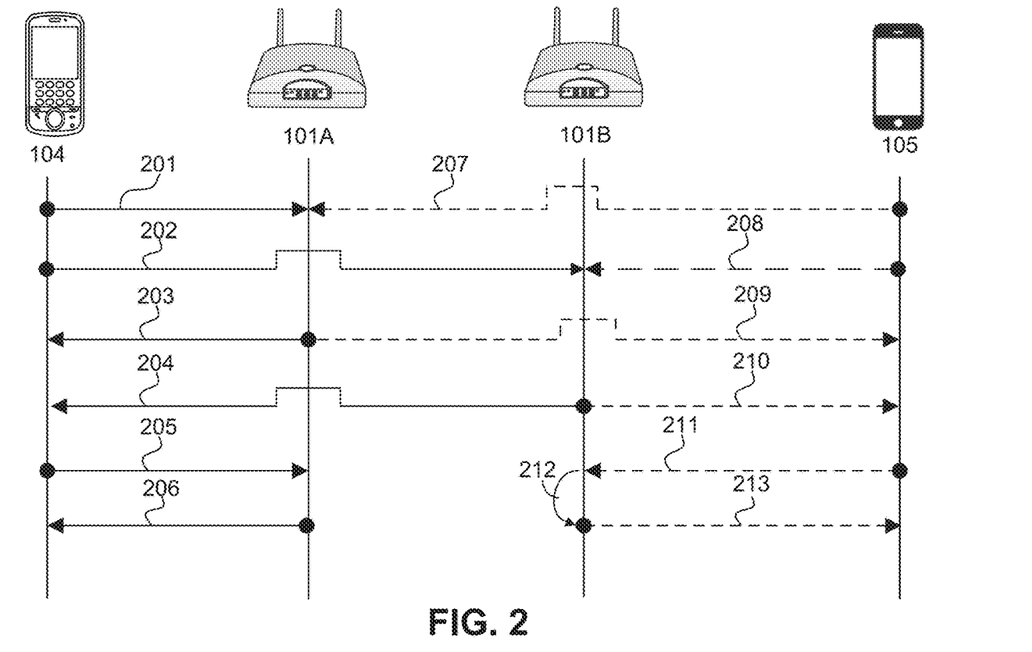
FIG. 2 is a transmission diagram of exemplary roaming communications between a legacy electronic device, access points, and an enterprise-capable electronic device, according to some embodiments.

FIG. 2 is a transmission diagram of exemplary roaming communications with probe message between electronic device 104, access points 101A-101B, and electronic device 105, according to some embodiments. In some embodiments, communications 201-206 between electronic device 104 and access points 101A-101B are legacy communications associated with legacy features for when electronic device 104 roams and selects either access point 101A or access point 101B. In some embodiments, communications 207-213 represent an exemplary out-of-band enterprise-feature advertising protocol between electronic device 105 and access points 101A-101B when electronic device 105 roams and selects either access point 101A or access point 101B.

In 201, electronic device 104 transmits a probe request to access point 101A. Similarly, in 202, electronic device 104 transmits another probe request to access point 101B.

In 203, access point 101A responds to the probe request in 201 with a probe response. In 204, access point 101B responds to the probe request in 202 with another probe response. In some embodiments, the probe responses from access point 101A and access point 101B can include an enterprise information element. In some embodiments, the enterprise information element may be implemented as a specific information bit which is set by the access point that sends the probe response. For example, in 203, access point 101A sets an information bit in the probe response prior to transmission to electronic device 104.

In some embodiments, access point 101A and access point 101B determine whether to include the enterprise information element in the probe response based on the probe request transmitted by electronic device 104 in 201 and 202, respectively. For example, the probe request transmitted by electronic device 104 can indicate that electronic device 104 is a legacy electronic device and/or does not support enterprise features such as IEEE 802.11k and IEEE 802.11r. If access point 101A and/or access point 101B determine, based on the probe request, electronic device 104 is a legacy electronic device, either access point transmits their respective probe response without including the enterprise information element.

In some embodiments, access point 101A and access point 101B do not determine whether electronic device 104 is a legacy electronic device and can include the enterprise information element in the probe responses. In some embodiments, access point 101A and access point 101B do not include the enterprise information element in probe responses in response to detecting an enterprise information element in received probe requests.

If the probe request does not include an enterprise information element, electronic device 104 does not parse or otherwise detect the enterprise information element because electronic device 104 is a legacy electronic device and is not capable of supporting enterprise features. In this regard, electronic device 104 is not aware that access points 101A-101B support enterprise features and views access points 101A-101B as a non-enterprise-feature access point. Based on receiving probe responses in 203 and 204, electronic device 104 may then select an access point with which to connect.

In 205, electronic device 104 may select access point 101A and initiate legacy association procedures that do not involve enterprise features. In 206, access point 101A ensures that enterprise features are disabled with respect to communications with electronic device 104 and completes association procedures with electronic device 104. In some embodiments, 205 and 206 represent established connections between electronic device 104 and access point 101A. Although not expressly illustrated, multiple messages may be included in the established connections 205 and 206. For example, in 205, electronic device 104 may transmit legacy IEEE 802.11 authentication requests, legacy IEEE 802.11 association requests, and legacy IEEE 802.1x EAP authentication messages. Similarly, in 206, access point 101A may transmit legacy IEEE 802.11 authentication responses, legacy IEEE 802.11 association responses, and legacy IEEE 802.1x EAP authentication messages.

In 207, electronic device 105 transmits a probe request to access point 101A. Similarly, in 208, electronic device 105 transmits another probe request to access point 101B. In some embodiments, the probe request from electronic device 105 includes an enterprise information element which indicates that electronic device 105 supports at least one enterprise feature. In some embodiments, the enterprise information element may be implemented as an Apple Device Information Element (ADIE). In some embodiments, the indication in the enterprise information element may be implemented as a specific IE bit set by electronic device 105 prior to transmission of the probe request. In some embodiments, the enterprise information element may be included in other messages as will be further discussed with respect to 211.

In 209, access point 101A responds to the probe request in 207 with a probe response. In 210, access point 101B responds to the probe request in 208 with another probe response. In some embodiments, the probe responses from access point 101A and access point 101B can include another enterprise information element, which as previously discussed, may be implemented as a specific information bit. For example, in 210, access point 101B sets an information bit in the probe response prior to transmission to electronic device 105.

In some embodiments, access point 101A and access point 101B determine whether to include the enterprise information element in the probe response based on the probe request transmitted by electronic device 105 in 207 and 208, respectively. For example, the probe request transmitted by electronic device 105 can include the enterprise information element that indicates that electronic device 105 supports enterprise features. If access point 101A and/or access point 101B determine, based on the probe request, electronic device 104 is an enterprise-capable electronic device, either access point may transmit their respective probe response including the enterprise information element.

In some embodiments, access point 101A and access point 101B do not determine whether electronic device 105 supports enterprise features and can include the enterprise information element in the probe responses. If a probe response includes an enterprise information element, electronic device 105 parses or otherwise detects the enterprise information element upon receiving the probe response. In some embodiments, when electronic device 105 detects that at least one access point that transmitted a probe response supports enterprise features, electronic device 105 may selectively enable enterprise features.

In 211-213, electronic device 105 and access point 101B perform an enterprise handshake to associate electronic device 105 with access point 101B based on enterprise features such as those provided by IEEE 802.11r, according to some embodiments. In 211, electronic device 105 may select access point 101B. This selection may be based on any number of factors including a comparison of network parameters between access point 101A and access point 101B such as signal strength and whether either access point supports enterprise features. In 211, electronic device 105 may further initiate enterprise association procedures based on enterprise features such as reduced association message functionality of IEEE 802.11r. In some embodiments, when neither access point 101A nor access point 101B supports enterprise features, electronic device 105 may selectively disable enterprise features prior to selecting and connecting with an access point.

In some embodiments, 211 represents an established connection between electronic device 105 and access point 101B through which multiple messages may be transmitted. For example, electronic device 105 may transmit enterprise IEEE 802.11 authentication requests and enterprise IEEE 802.11 association requests. Enterprise request messages, such as enterprise IEEE 802.11 authentication request frames and enterprise IEEE 802.11 association request frames, transmitted in 211 may include the enterprise information element that indicates that electronic device 105 supports enterprise features. When included as part of an authentication request frame or an association request frame, the information element may be implemented as a mobility domain information element (MDIE), according to some embodiments.

In 212, upon receiving an indication that electronic device 105 is attempting to associate with it and after detecting that a message transmitted by electronic device 105 (e.g., a probe request in 208 or an association request frame in 211), access point 101B can selectively enable one or more enterprise features supported by electronic device 105. Other instances of when access point 101B selectively enables the one or more enterprise features is within the scope of this disclosure. Access point 101B may also selectively enable the one or more enterprise features upon receiving a message from electronic device 105 that includes an enterprise information element such as a probe request in 208.

In 213, access point 101B ensures that enterprise features are enabled with respect to communications with electronic device 105 and completes association procedures with electronic device 105. In some embodiments, 213 represents an established connection between electronic device 105 and access point 101B and through which messages may be transmitted. For example, access point 101B may transmit enterprise IEEE 802.11 authentication responses and enterprise IEEE 802.11 association responses. Enterprise response messages, such as IEEE 802.11 authentication response frames and IEEE 802.11 association response frames, transmitted in 213 may include the enterprise information element that indicates that access point 101B supports enterprise features.

Figure 3:
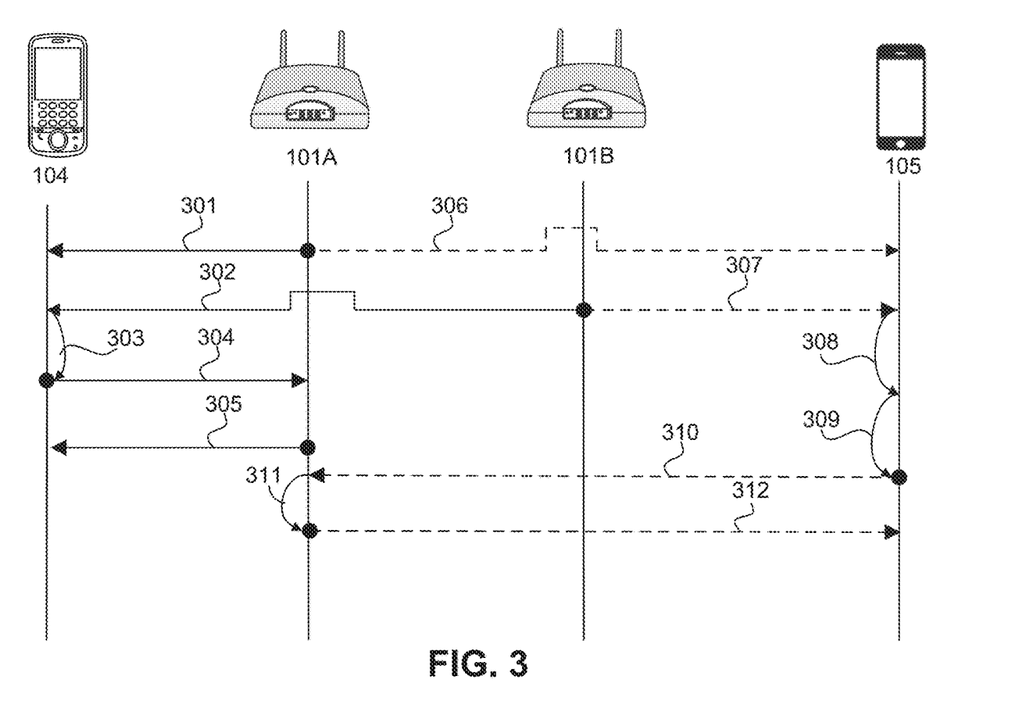
FIG. 3 is a transmission diagram of exemplary roaming communications between a legacy electronic device, access points, and an enterprise-capable electronic device, according to some embodiments.

FIG. 3 is a transmission diagram of exemplary roaming communications with beacon messages between electronic device 104, access points 101A-101B, and electronic device 105, according to some embodiments. In some embodiments, communications 301-305 between electronic device 104 and access points 101A-101B are legacy communications associated with legacy features for when electronic device 104 roams and selects either access point 101A or access point 101B. In some embodiments, communications 306-312 represent an exemplary out-of-band enterprise-feature advertising protocol between electronic device 105 and access points 101A-101B when electronic device 105 roams and selects either access point 101A or access point 101B.

In 301 and 306, access point 101A broadcasts at least one advertising message. The at least one advertising message may be a beacon message, according to some embodiments. In some embodiments, access point 101A broadcasts one advertising message in 301 and 306. In some embodiments, access point 101A broadcasts separate advertising messages in 301 and 306. The advertising message in 301 and 306 is not necessarily addressed to any particular device but can be received by any device within range of access point 101A such as, for example, electronic device 104 and/or electronic device 105.

In some embodiments, access point 101A supports enterprise features and configures the advertising message to include an advertising information element that indicates that access point 101A supports enterprise features. In some embodiments, the indication in the information element may be implemented as a specific information element bit set by access point 101A prior to broadcast of the advertising message in 301 and 306. In 301, electronic device 104 may receive the advertising message broadcasted by access point 101A. In 306, electronic device 105 may receive the advertising message broadcasted by access point 101A.

Similarly, in 302 and 307, access point 101B broadcasts another advertising message such as, for example, another beacon message. Similar to access point 101A, access point 101B may broadcast one advertising message or separate messages in 301 and 306. The advertising message in 302 and 307 is not necessarily addressed to any particular device but can be received by any device within range of access point 101B such as, for example, electronic device 104 and/or electronic device 105. The advertising message may include an advertising information element if access point 101B supports enterprise features. In some embodiments, the information element may indicate support for enterprise features through a specific information element bit set by access point 101B prior to broadcasting the advertising message in 302 and 307. In some embodiments, access point 101A and access point 101B continuously broadcast their respective advertising messages at predetermined intervals of time. In some embodiments, when neither access point 101A nor access point 101B supports enterprise features, the advertising messages would not include an indication that the access points support enterprise features.

In 302, electronic device 104 may receive the advertising message broadcasted by access point 101B. In 307, electronic device 105 may receive the advertising message broadcasted by access point 101B.

In 303, electronic device 104 may select which access point with which to associate. This selection may be based on any number of factors including signal strength of the access point and other information provided in the advertising message of 301 and 302. Electronic device 104, as a legacy electronic device, does not parse or detect the advertising information element in the advertising messages from access point 101A and access point 101B. Accordingly, electronic device 104 views both access points as legacy access points and initiates a legacy association procedure after making its selection.

In 304, after having selected access point 101A, electronic device 104 initiates legacy association procedures. In 305, access point 101A ensures that enterprise features are disabled with respect to communications with electronic device 104 and completes association procedures with electronic device 104. In some embodiments, 304 and 305 represent established connections between electronic device 104 and access point 101A through which one or more messages may be transmitted. For example, in 304, electronic device 104 may transmit messages including legacy IEEE 802.11 authentication requests, legacy IEEE 802.11 association requests, and legacy IEEE 802.1x EAP authentication messages. Similarly, in 305, exemplary messages from access point 101A may include legacy IEEE 802.11 authentication responses, legacy IEEE 802.11 association responses, and legacy IEEE 802.1x EAP authentication messages.

In 308, electronic device 105 may select which access point with which to associate. This selection may be based on connectivity information regarding the access point including signal strength of the access point and other information provided in the advertising messages of 306 and 307 including the advertising information element. In 309, electronic device 105, as a device capable of supporting enterprise features, further parses or otherwise detects the advertising element in the advertising messages from access point 101A and access point 101B. In some embodiments, when electronic device 105 detects that at least one access point that transmitted a probe response supports enterprise features, electronic device 105 may selectively enable enterprise features.

In 310-312, electronic device 105 and access point 101A perform an enterprise handshake in order to associate electronic device 105 with access point 101A based on enterprise features such as those provided by IEEE 802.11r. In 310, after having selected access point 101A, electronic device 105 may initiate enterprise association procedures based on enterprise features such as reduced association message functionality of IEEE 802.11r. In 311, access point 101A enables enterprise features with respect to communications with electronic device 105 and completes enterprise association procedures with electronic device 105 in 312. In some embodiments, 310 and 312 represent established connections between electronic device 105 and access point 101A through which one or more messages may be transmitted. For example, in 310, electronic device 105 may transmit enterprise IEEE 802.11 authentication requests and enterprise IEEE 802.11 association requests. Enterprise request messages, such as IEEE 802.11 authentication request frames and IEEE 802.11 association request frames, transmitted in 310 may further include the enterprise information element that indicates that electronic device 105 supports enterprise features. When included as part of an authentication request frame or an association request frame, the information element may be implemented as a mobility domain information element (MDIE), according to some embodiments.

Similarly, in 312, exemplary messages transmitted by access point 101B may include enterprise IEEE 802.11 authentication responses and enterprise IEEE 802.11 association responses. Enterprise response messages, such as enterprise IEEE 802.11 authentication response frames and enterprise IEEE 802.11 association response frames, transmitted in 312 may further include the enterprise information element that indicates that access point 101A supports enterprise features.

Figure 4:
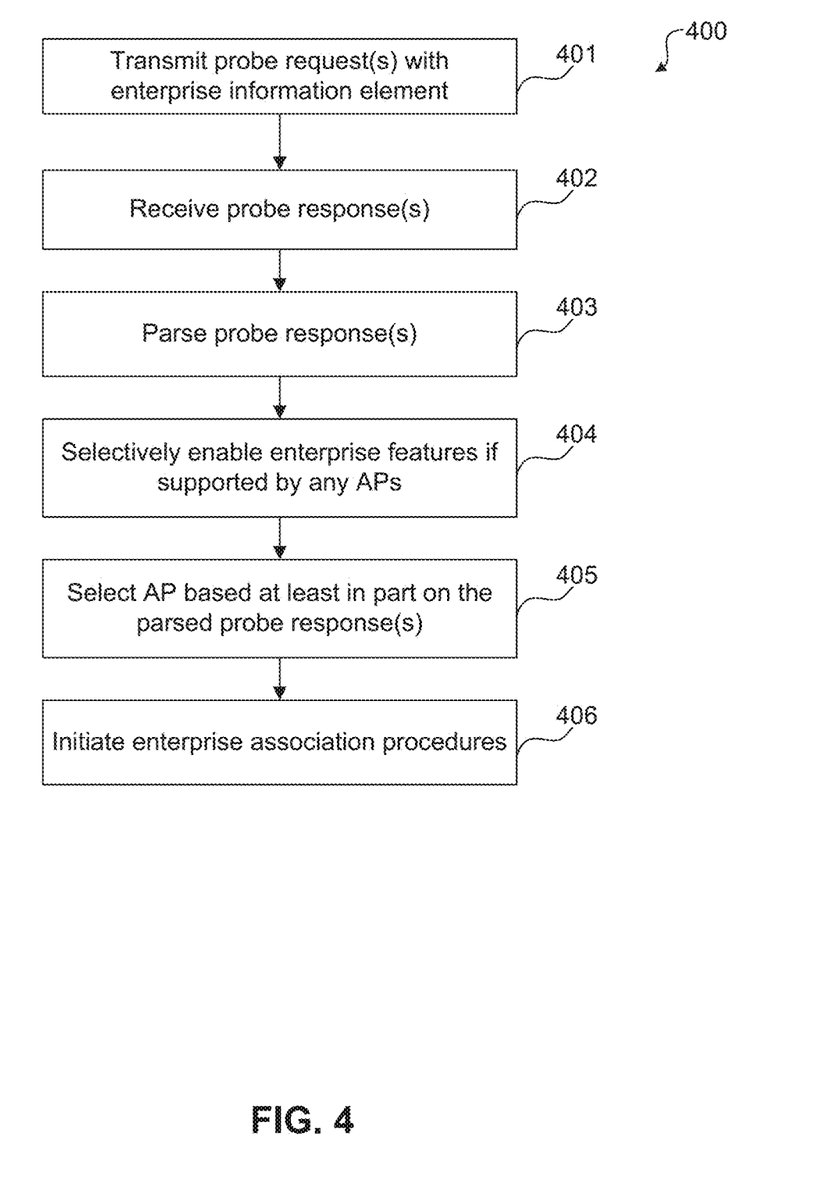
FIG. 4 is a flowchart illustrating an exemplary method for an enterprise-capable electronic device to associate with an access point based on probe messages, according to some embodiments.

FIG. 4 is a flowchart illustrating an exemplary method 400 for an enterprise-capable electronic device to associate with an access point based on probe messages, according to some embodiments. In 401, an electronic device that supports enterprise features, such as electronic device 105, roams and searches for an access point with which to associate. In 401, electronic device 105 may transmit one or more probe requests to one or more access points within range of electronic device 105. The probe requests include an enterprise information element.

In 402, electronic device 105 may monitor received messages for one or more probe responses transmitted in response to probe requests transmitted in 401. The probe responses may be received from one or more access points that received the probe requests. In 403, electronic device 105 may parse the received probe responses for information regarding the access point that transmitted the respective probe responses. Information in the probe response may include an indication from the access point that it supports enterprise features and is compatible with enterprise association procedures such as those provided by IEEE 802.11r. As previously discussed, in some embodiments, the indication can be an enterprise information element, such as a specific information element bit, within the probe response. In some embodiments, if electronic device 105 detects that the access point does not support enterprise features (e.g., the probe response does not include an indication that the access point supports enterprise features), electronic device 105 may selectively disable enterprise features prior to selecting and connecting with the access point.

In 404, when electronic device 105 detects that at least one access point that transmitted a probe response in 402 supports enterprise features, electronic device 105 may selectively enable enterprise features. In 405, electronic device 105 may select an access point with which to associate based on any number of factors including the probe responses and other connectivity information regarding the access points, such as signal strength. For example, electronic device 105 may use the enterprise information element as a factor in its selection and the additional information regarding the access points as other factors.

In 406, after selection of an access point, electronic device 105 may initiate enterprise association procedures with the selected access point. As a result of the information elements exchanged between electronic device 105 and the selected access point, electronic device 105 is aware that the selected access point supports enterprise features (and vice versa). Accordingly, electronic device 105 may initiate enterprise association procedures which include transmission of enterprise IEEE 802.11 authentication requests and enterprise IEEE 802.11 association requests. Enterprise IEEE 802.11 association requests include session key information which eliminates IEEE 802.1x EAP authentication steps required in legacy association procedures.

Figure 5:
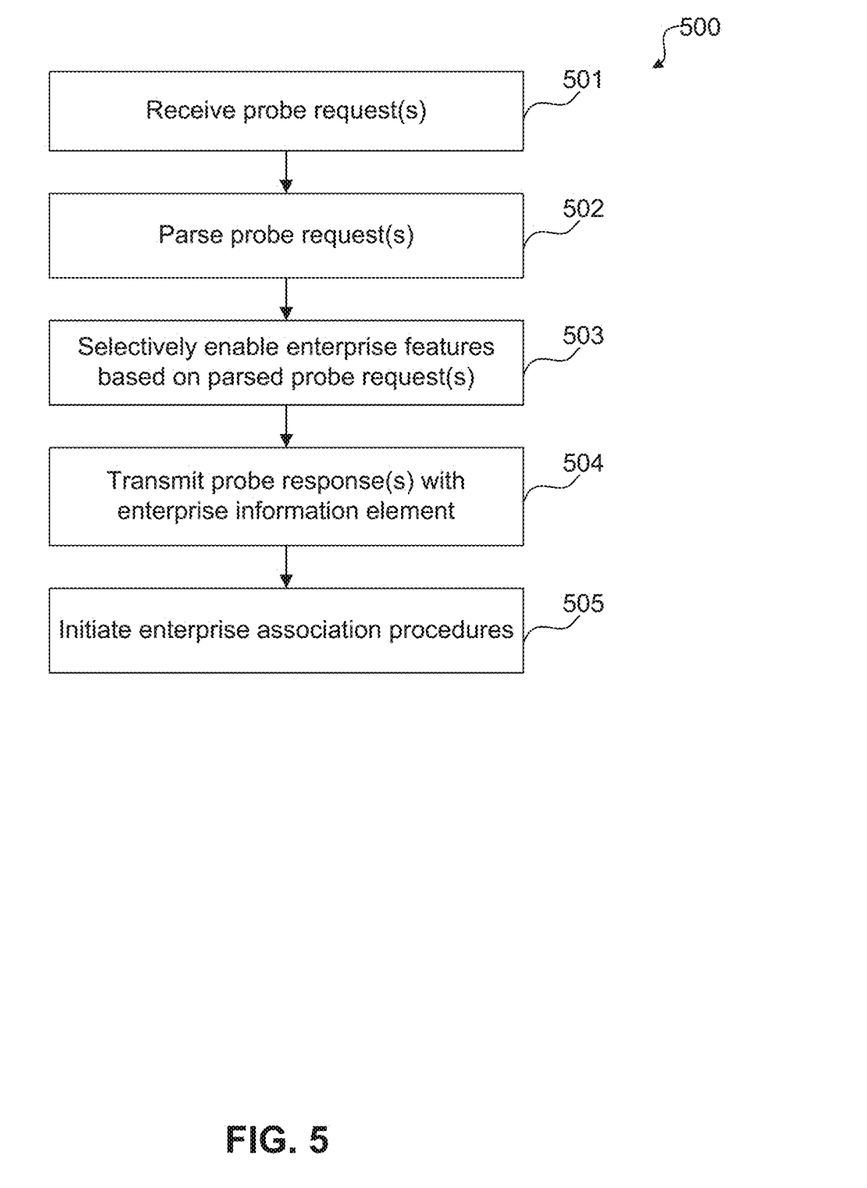
FIG. 5 is a flowchart illustrating an exemplary method for an access point to enable enterprise features based on probe requests, according to some embodiments.

FIG. 5 is a flowchart illustrating an exemplary method 500 for an access point to enable enterprise features based on probe requests, according to some embodiments. In 501, an access point that supports enterprise features, such as access point 101A, receives one or more probe requests. Access point 101A can receive probe requests from one or more electronic devices that roam and seek to locate another access point with which to associate. Access point 101A may receive probe requests from both legacy electronic devices, such as electronic device 104, and enterprise-capable electronic devices, such as electronic device 105.

In 502, access point 101A may parse the received probe requests for information, such as an enterprise information element, indicating whether the one or more electronic devices that transmitted the probe requests support enterprise features. In some embodiments, access point 101A detects that a specific information element bit within the probe request is set. In 503, access point 101A may selectively enable its enterprise features in communications with certain electronic devices based on detecting the enterprise information element in probe requests from those electronic devices.

In some embodiments, upon determining that a probe request includes the enterprise information element, access point 101A may transmit a probe response that also includes an enterprise information element that indicates that access point also supports enterprise features in 504. In some embodiments, access point 101A may transmit the probe response with the enterprise information element regardless of the results of parsing the probe requests in 502. Including the enterprise information in the probe response enables access point 101A to confirm that enterprise features are available.

In 505, access point 101A participates in enterprise association procedures with one or more electronic devices that have initiated the association, such as through the transmission of an IEEE 802.11 authentication request.

Figure 6:
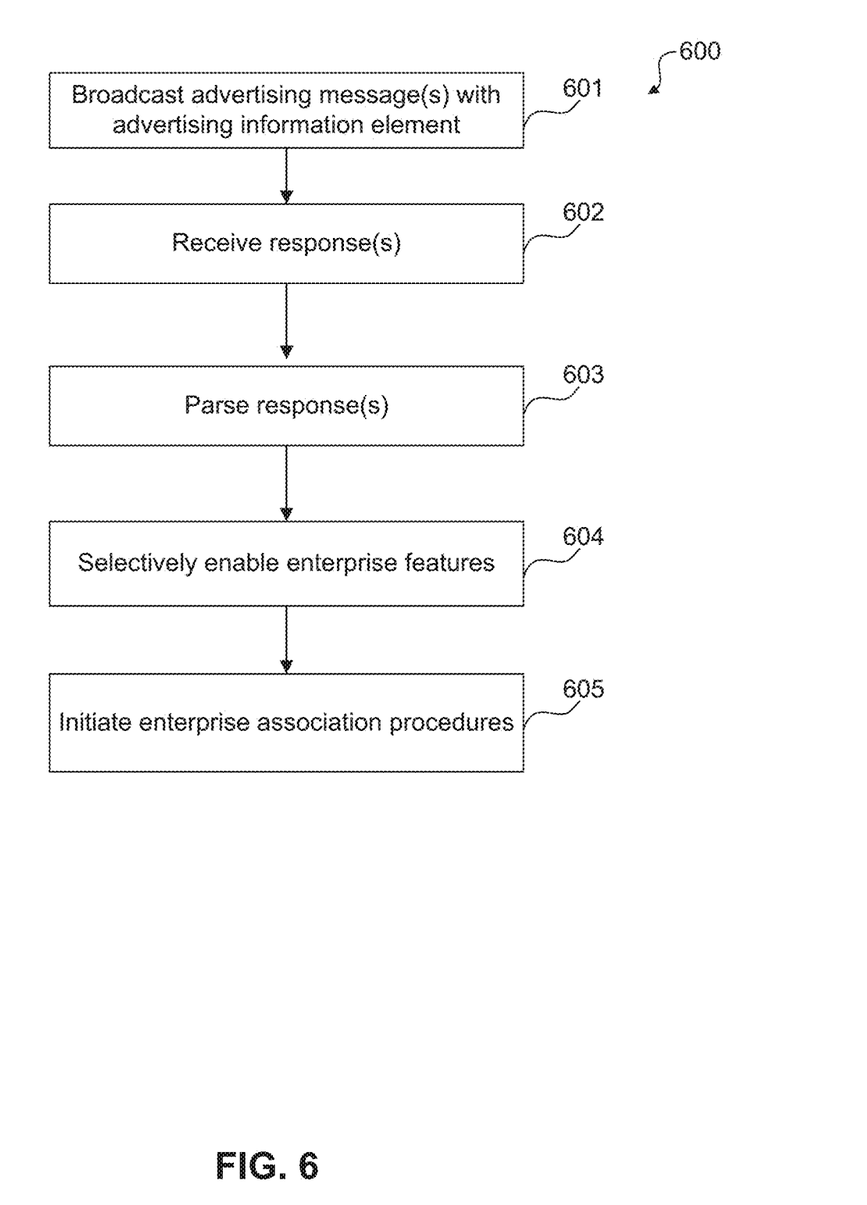
FIG. 6 is a flowchart illustrating an exemplary method for an access point to selectively enable enterprise features based on advertising messages with an enterprise-capable electronic device, according to some embodiments.

FIG. 6 is a flowchart illustrating an exemplary method 600 for an access point to associate with an enterprise-capable electronic device based on advertising messages, according to some embodiments. In 601, an access point that supports enterprise features, such as access point 101A, broadcasts one or more advertising messages that includes an advertising information element. In some embodiments, the advertising information element is a specific information element bit that is set to a predetermined value within the one or more advertising messages.

In 602, access point 101 receives one or more responses to the broadcasted advertising messages. The one or more responses may be transmitted by one or more electronic devices that are within range of access point 101A and received the broadcasted advertising messages. Access point 101A can receive responses from one or more electronic devices that roam and seek to locate another access point with which to associate. Access point 101A may receive responses from both legacy electronic devices, such as electronic device 104, and enterprise-capable electronic devices, such as electronic device 105.

In 603, access point 101A may parse the received responses for information, such as an enterprise information element, indicating whether the one or more electronic devices that transmitted the responses support enterprise features. In some embodiments, access point 101A detects that a specific information element bit within the response is set to a specific value. In 604, access point 101A may selectively enable its enterprise features in communications with certain electronic devices based on detecting the enterprise information element in probe responses from those electronic devices. In 605, access point 101A participates in enterprise association procedures with one or more electronic devices that have initiated the association, such as through the transmission of an IEEE 802.11 authentication request.

Figure 7:
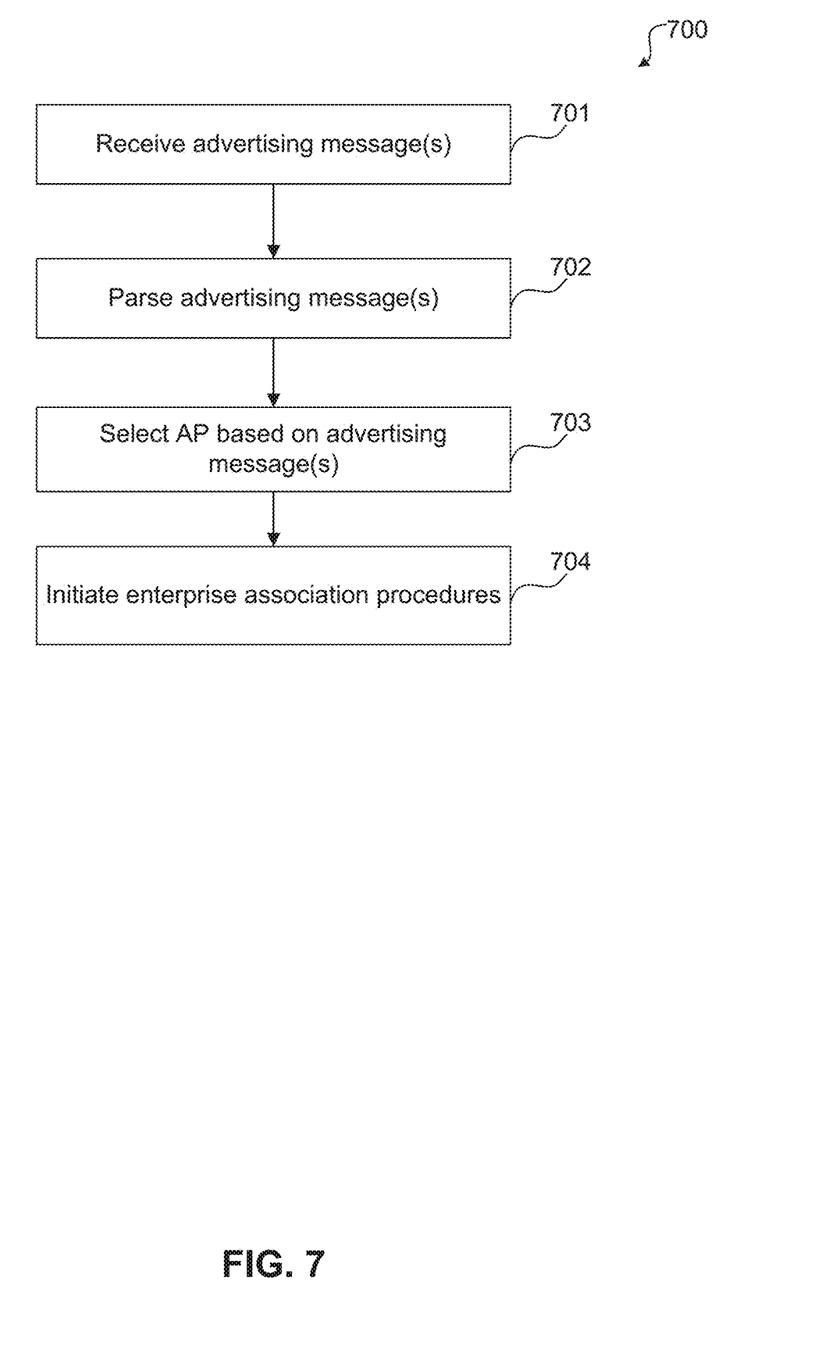
FIG. 7 is a flowchart illustrating an exemplary method for an enterprise-capable electronic device to associate with an access point based on advertising messages, according to some embodiments.

FIG. 7 is a flowchart illustrating an exemplary method 700 for an enterprise-capable electronic device to associate with an access point based on advertising messages, according to some embodiments. In 701, an electronic device that supports enterprise features, such as electronic device 105, roams and searches for an access point with which to associate. In 701, electronic device 105 may receive one or more advertising messages from one or more access points within range of electronic device 105.

In 702, electronic device 105 may parse the received advertising messages for information regarding the access point that transmitted the respective advertising messages. Advertising messages from access points that support enterprise features include an advertising information element. In some embodiments, the advertising information element is implemented as a specific information element bit within the advertising message.

In 703, electronic device 105 may select an access point with which to associate based on any number of factors including the advertising messages and other connectivity information regarding the access points, such as signal strength. For example, electronic device 105 may use the advertising information element as a factor in its selection and the additional information regarding the access points as other factors. In 704, after selection of an access point, electronic device 105 may initiate enterprise association procedures with the selected access point.

Figure 8:
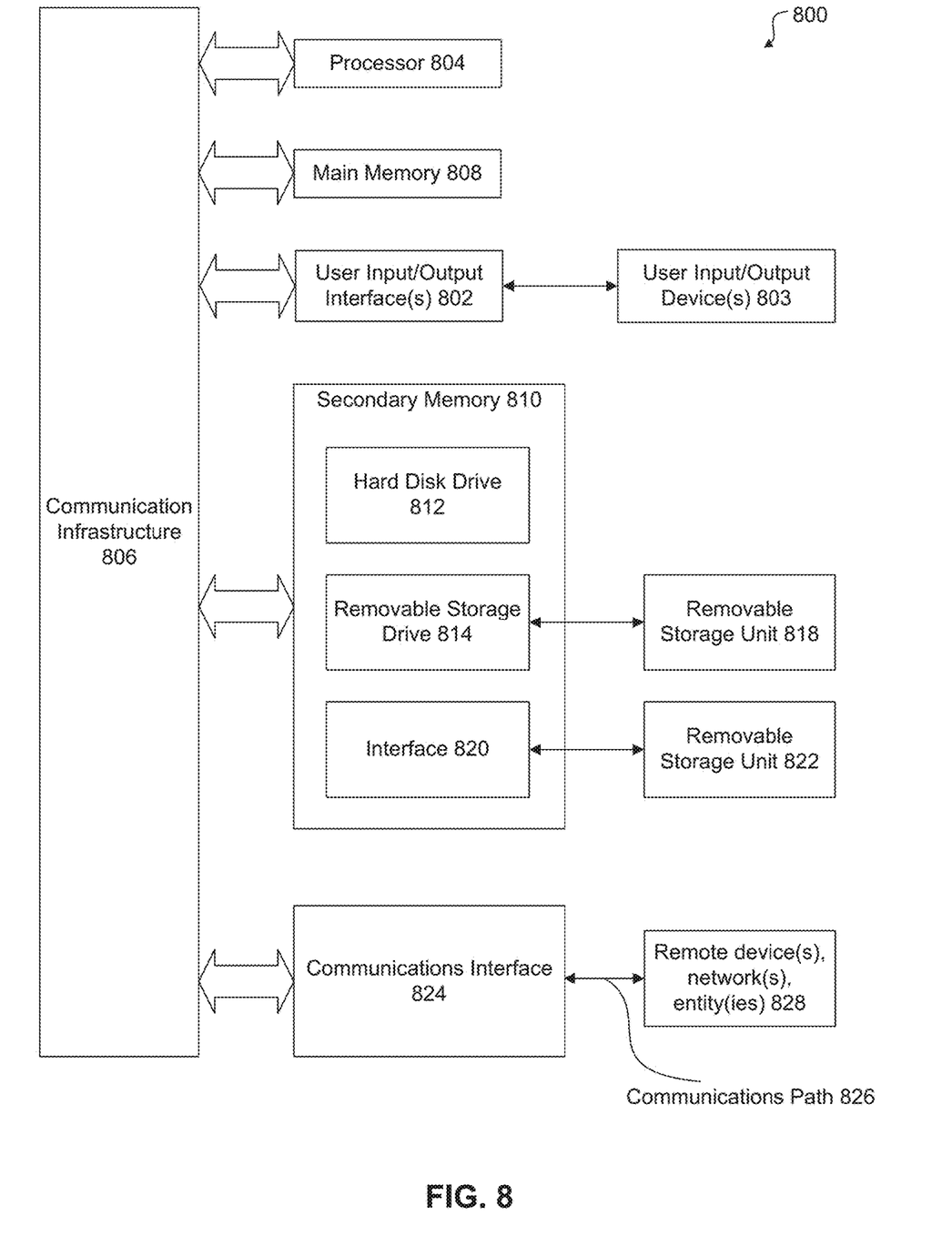
FIG. 8 is an example computer system for implementing various embodiments of the disclosure.

Various embodiments can be implemented, for example, using one or more computer systems, such as computer system 800 shown in FIG. 8. Computer system 800 can be used, for example, to implement method 400 of FIG. 4, method 500 of FIG. 5, method 600 of FIG. 6, and/or method 700 of FIG. 7. For example, computer system 800 can perform a process for transmitting a single-user aggregated frame having data with multiple traffic identifiers, according to some embodiments. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In some embodiments, a GPU is a specialized processor designed to process mathematically-intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In some embodiments, a tangible apparatus or article of manufacture including a tangible computer useable or readable medium having control logic (software) stored thereon is also referred to herein as a "computer program product" or "program storage device." This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein—e.g., to execute the operations in method 400 of FIG. 4, method 500 of FIG. 5, method 600 of FIG. 6, and/or method 700 of FIG. 7.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons stilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    transmitting, by an enterprise-capable electronic device, a probe request comprising a first information element to a wireless access point, wherein the first information element indicates that the enterprise-capable electronic device supports at least one enterprise feature;
    receiving, by the enterprise-capable electronic device, a probe response in response to transmitting the probe request, wherein the probe response comprises connectivity information indicating whether the wireless access point supports the at least one enterprise feature;
    responsive to determining, based on the connectivity information, that the wireless access point supports the at least one enterprise feature:
        associating, by the enterprise-capable electronic device, with the wireless access point based at least in part on the connectivity information and the at least one enterprise feature for enterprise communications with the wireless access point; and
        transmitting, by the enterprise-capable electronic device, a first message to the wireless access point, wherein the first message is transmitted based on the at least one enterprise feature;
    responsive to determining, based on the connectivity information, that the wireless access point does not support the at least one enterprise feature:
        associating, by the enterprise-capable electronic device, with the wireless access point based at least in part on connectivity for legacy communications with the wireless access point; and
        transmitting, by the enterprise-capable electronic device, a second message to the wireless access point, wherein the second message is transmitted based on the connectivity for legacy communications.

2. The method of claim 1, wherein the at least one enterprise feature comprises an IEEE 802.11r capability.

3. The method of claim 1, wherein the first information element comprises an Apple Device information element.

4. The method of claim 1, wherein the first information element comprises a mobility domain information element.

5. The method of claim 1, further comprising:
    parsing, by the enterprise-capable electronic device, the probe response.

6. The method of claim 1, wherein the probe request includes session key information and wherein the session key information in the probe request is configured to eliminate transmission, by the enterprise-capable electronic device, of an IEEE 802.11 extensible authentication protocol (EAP) message subsequent to transmitting the probe request.

7. The method of claim 1, further comprising:
    responsive to receiving the probe response and without transmitting an IEEE 802.11 extensible authentication protocol (EAP) message, initiating an enterprise handshake with the wireless access point.

8. The method of claim 1, wherein the at least one enterprise feature comprises an IEEE 802.11k capability.

9. The method of claim 1, wherein the connectivity information comprises a second information bit and determining the wireless access point does not support the at least one enterprise feature further comprises:
    detecting that the second information bit is absent from the probe response.

10. A method comprising:
    transmitting, by an enterprise-capable electronic device, a first probe request comprising a first information element to a first wireless access point and a second probe request comprising a second information element to a second wireless access point, wherein one of the first and second information elements indicates that the enterprise-capable electronic device supports at least one enterprise feature;
    receiving, by the enterprise-capable electronic device, a probe response in response to transmitting the first probe request, wherein the probe response comprises first connectivity information regarding the first wireless access point, wherein the first connectivity information indicates that the first wireless access point supports the at least one enterprise feature;
    receiving, by the enterprise-capable electronic device, a second probe response in response to transmitting the second probe request, wherein the second probe response comprises second connectivity information regarding legacy communications with the second wireless access point, wherein the second connectivity information indicates that the second wireless access point does not support the at least one enterprise feature;
    determining whether to associate with the first wireless access point or the second wireless access point based at least in part on the first connectivity information and the second connectivity information;
    responsive to associating with the first wireless access point, transmitting, by the enterprise-capable electronic device, a first message to the first wireless access point, wherein the first message is transmitted based on the at least one enterprise feature; and
    responsive to associating with the second wireless access point, transmitting, by the enterprise-capable electronic device, a second message to the second wireless access point, wherein the second message is transmitted based on the second connectivity information regarding legacy communications.

11. The method of claim 10, wherein the at least one enterprise feature comprises an IEEE 802.11r capability.

12. The method of claim 10, wherein the first and second information elements comprise Apple Device information elements.

13. The method of claim 10, further comprising:
    parsing, by the enterprise-capable electronic device, the first connectivity information;
    determining, by the enterprise-capable electronic device, based at least in part on the first connectivity information, that the first wireless access point supports the at least one enterprise feature;
    parsing, by the enterprise-capable electronic device, the second connectivity information; and
    determining, by the enterprise-capable electronic device, based at least in part on the second connectivity information, that the second wireless access point does not support the at least one enterprise feature.

14. The method of claim 13, wherein the first connectivity information comprises a third information element that indicates that the wireless access point supports the at least one enterprise feature.

15. The method of claim 10, the first and second information elements comprise mobility domain information elements.

16. The method of claim 10, wherein the first information element comprises a predetermined information bit set by the enterprise-capable electronic device within the first probe request and the second information element comprises the predetermined information bit within the second probe request.

17. The method of claim 10, further comprising:
    determining, by the enterprise-capable electronic device, whether the first connectivity information indicates that the first wireless access point supports the at least one enterprise feature; and
    determining, by the enterprise-capable electronic device, whether the second connectivity information indicates that the second wireless access point supports the at least one enterprise feature.

18. The method of claim 10, wherein the second probe request includes session key information and wherein the session key information is configured to eliminate transmission, by the enterprise-capable electronic device, an IEEE 802.11 extensible authentication protocol (EAP) message subsequent to transmitting the first probe request and the second probe request.

19. An enterprise-capable electronic device comprising:
    a processor configured to:
        receive at least one advertising message from at least one wireless access point;
        detect an enterprise information element in the at least one advertising message, wherein the enterprise information element indicates whether the at least one wireless access point supports an enterprise feature;
        responsive to determining, based on the enterprise information element, that the wireless access point supports the at least one enterprise feature, cause to transmit, by the enterprise-capable electronic device, a first message to the at least one wireless access point, wherein the first message is transmitted based on the at least one enterprise feature;
        responsive to determining, based on the enterprise information element, that the wireless access point does not support the at least one enterprise feature, cause to transmit, by the enterprise-capable electronic device, a second message to the at least one wireless access point, wherein the second message is transmitted based on connectivity for legacy communications, wherein the first message and the second message comprise a probe request, wherein the probe request includes session key information; and
        receive a probe response from the wireless access point, wherein the probe request and probe response are used to establish a session key based on the session key information between the wireless access point and the electronic device.

20. The electronic device of claim 19, wherein the session key information in the probe request is configured to eliminate transmission, by the electronic device, of an IEEE 802.11 extensible authentication protocol (EAP) message subsequent to transmitting the probe request.

* * * * *